United States Patent [19]
Ginosar et al.

[11] Patent Number: 5,948,096
[45] Date of Patent: *Sep. 7, 1999

[54] APPARATUS AND METHOD FOR SELF-TIMED MARKING OF VARIABLE LENGTH INSTRUCTIONS HAVING LENGTH-AFFECTING PREFIX BYTES

[75] Inventors: Ran Ginosar, Nofit; Rakefet Kol, Haifa, both of Israel; Kenneth Scott Stevens, Hillsboro, Oreg.; Peter A. Beerel, Long Beach; Kenneth Yi Yun, San Diego, both of Calif.; Christopher John Myers, Salt Lake City, Utah; Shai Rotem, Beaverton, Oreg.

[73] Assignee: Intel Corporation, Santa Clara, Calif.

[ * ] Notice: This patent is subject to a terminal disclaimer.

[21] Appl. No.: 08/997,462
[22] Filed: Dec. 23, 1997
[51] Int. Cl.$^6$ .................................................. G06F 9/30
[52] U.S. Cl. .................... 712/210; 712/212; 712/213; 712/245; 712/246
[58] Field of Search .................... 712/200–230, 712/40

[56] References Cited

U.S. PATENT DOCUMENTS

| | | | |
|---|---|---|---|
| 4,680,701 | 7/1987 | Cochran | 712/40 |
| 5,347,639 | 9/1994 | Rechtschaffen | 712/203 |
| 5,535,347 | 7/1996 | Grochowski | 712/204 |
| 5,553,276 | 9/1996 | Dean | 364/269 |
| 5,758,116 | 5/1998 | Lee | 712/210 |
| 5,870,599 | 2/1999 | Hinton | 712/239 |

Primary Examiner—Meng-Ai T. An
Assistant Examiner—Stacy Whitmore
Attorney, Agent, or Firm—Kenyon & Kenyon

[57] ABSTRACT

A self-timed instruction marking circuit includes a prefix handling system for processing instruction bytes having prefix bytes. Length decoders receive instruction data bytes, and perform length decoding independently of the other length decoders in the instruction marking circuit. A length decoder determines whether a byte being processed is a prefix byte to an instruction. If a length-affecting prefix byte is found, the length decoder signals a subsequent length decoder to indicate that a prefix byte has been found. The subsequent length decoder uses the prefix signal to appropriately length decode the byte being processed by the subsequent length decoder. Signals are provided to continue the self-timed marking process. Prefix handling may also be used in a multiple marking unit configuration of an instruction marking circuit.

18 Claims, 5 Drawing Sheets

TOP-LEVEL BLOCK DIAGRAM

APPARATUS AND METHOD FOR SELF-TIMED MARKING OF VARIABLE LENGTH INSTRUCTIONS HAVING LENGTH-AFFECTING PREFIX BYTES

FIELD OF THE INVENTION

The present invention is directed to a computer system executing variable length instructions. More particularly, the present invention provides an instruction decoding circuit having a self-timed length decoding, marking, and steering system, and capable of processing instructions having length-affecting prefix bytes.

BACKGROUND OF THE INVENTION

Computer systems are capable of executing various arithmetic and logic operations on data. The particular arithmetic or logic operation to be executed is indicated by an "instruction" that is typically retrieved from a memory of the computer system, decoded in an instruction decode block, and then transmitted to an execution block of the computer for execution. Computer programs comprise a set of instructions that, when taken from memory, decoded and transmitted to the execution block in a certain sequence, cause the computer system to execute a series of operations that achieve the objective of the program.

There are computer systems designed to implement a variable length instruction architecture, wherein instructions can vary in length from, for example, one byte to eleven bytes or more. However, memory systems, and in particular the cache memory used to store instructions prior to execution, typically store data in fixed sized blocks such as, for example, sixteen byte blocks. In such a system, instruction data is fetched in sixteen byte lines aligned on sixteen byte boundaries. Accordingly, in a variable length instruction architecture, each fixed sized line fetched from memory contains instructions of various lengths that may start anywhere within the line and may even cross a line boundary into a succeeding line of memory.

An instruction marking circuit is typically implemented in the instruction decode block of a computer having a variable length instruction architecture in order to mark the beginning of each instruction in a line fetched from a fixed sized line memory system. The instruction marking circuit includes length decoders, which process a selected byte or number of bytes of the fetched line to determine a length for the instruction containing the bytes. Once instruction lengths are determined and first instruction bytes are marked, the instructions of the fetched line can be transmitted to an instruction decoding circuit within the decode block.

Instruction marking is, by nature, a serial operation, since the beginning of a particular instruction can be determined with certainty only after the beginning and length of a previous instruction have been determined. In present instruction marking circuits, the serial nature of instruction marking is accommodated by performing the marking operation according to an externally-timed scheme that controls and synchronizes circuit operations by a system clock. Marking information is propagated through the marking circuit in synchronization with the system clock. The length decoders that are typically used in marking circuits, however, comprise combinational logic circuits that perform length decodes in varying amounts of time depending upon the particular instruction being processed. To assure that all possible instructions found in an instruction line fetched from memory will be marked, the timing of the clock signals must be sufficient to process a "worst case" decode time for an instruction. That is, the timing must be sufficient to permit signals to traverse the longest path through the combinational logic of the length decoder, thus delaying the propagation of marking signals through the marking circuit when the instruction is not a "worst case" instruction.

Only a limited subset of instructions are of the "worst case" instruction type. Thus the time required for processing this relatively small subset of instructions is imposed on all marking operations such that the overall time needed for instruction marking is longer than actually required in most instances. As a result, the known scheme for marking instructions in a variable length instruction architecture incurs wasteful delay in the instruction execution process, decreasing system performance.

The patent application Serial No. 08/997,457, entitled "Parallel Processing and Self-Timed Serial Marking of Variable Length Instructions" (filed on even date herewith), provides for fast and efficient instruction decoding through the self-timed length decoding, marking, and steering of instructions. An embodiment of a computer system according to the teachings of the aforementioned application is shown in FIG. 1 (and described in more detail by the aforementioned application). As shown in FIG. 1, an instruction fetch, decode, and execute pipeline 1 is implemented in a computer system. An instruction cache 10 is a memory used to store a set of instructions that are most likely required by the computer for execution in the near future, in accordance with known caching techniques. The instructions are stored in and fetched from the instruction cache 10 in instruction lines, each comprising a fixed sized block of bytes, for example, sixteen bytes. Each instruction line stored in the instruction cache 10 is aligned within the memory along a sixteen byte boundary. Each instruction contained in a line can vary in length from one byte to the maximum byte length used in the computer system, and any particular line of instructions can contain instructions of any combination of byte lengths.

An instruction fetch block 12 operates to fetch a line of instructions for input to an instruction decode block 14. The instruction decode block 14 decodes the instructions within the line fetched from the instruction cache 10 for input to an execution block 16 for execution, as is generally known. An instruction issue block 18 can be implemented to receive decoded instructions from the instruction decode block 14 for transfer to the execution block 16.

As noted above, the instructions stored in the instruction cache 10 can vary in length and instructions of any combination of lengths can be found in any particular instruction line fetched from the instruction cache 10. Accordingly, the instruction decode block 14 includes an instruction marking circuit 20 that operates to mark the first byte of each instruction contained in a fetched line. Once marked, the instructions are transferred, for example, to an instruction steering circuit 22 to await transfer to an instruction decode circuit 24. The instruction decode circuit 24 decodes the instructions and outputs decoded instructions to the instruction issue block 18.

FIG. 2 shows an embodiment of an instruction decode block 14 using the self-timed techniques of the aforementioned application. Instruction lines fetched from the instruction cache 10 by instruction fetch block 12 are received by an instruction line buffer 26 of the instruction marking circuit 20. Instruction line buffer 26 may be implemented as a FIFO, such that multiple instruction lines can be stored in anticipation of the marking process.

The instruction marking circuit 20 can be described as being arranged in "columns" corresponding to each byte position of the instruction line buffer 26. Thus, a column "contains" those functional units used to process a byte for the particular byte position in the instruction line. For an instruction line width of, for example, sixteen bytes, the instruction marking circuit 20 can be described as having sixteen columns, each containing the functional units used in byte processing. Those columns corresponding to the first byte positions of the instruction line buffer (i.e. lower memory addresses) are considered the "front" of the instruction marking circuit, while those columns corresponding to the last byte positions of the instruction line buffer (i.e. higher memory addresses) are considered the "end" of the instruction marking circuit. Relative to each other, columns associated with lower memory addresses are considered "upstream" columns, while columns associated with higher memory addresses are considered "downstream" columns.

Each byte of the instruction line is separately sent to a respective byte latch 28 in each column of the instruction marking circuit 20. The byte is processed by a length decoder 30 for that same column of the instruction marking circuit 20, together with any additional downstream bytes in byte latches 28 of downstream columns, as may be required by the length decoding algorithm used in the variable instruction length architecture. The combinational logic implemented in the length decoder 30 produces a signal indicating the computed length of the instruction, under the assumption that the byte being processed is the first byte of an instruction.

To indicate instruction length, each length decoder 30 has a number of length signal outputs. The length signal outputs are coupled to length signal output lines 38, which are further coupled to other functional units in the instruction marking circuit 20, as described below. The number of length signal outputs (and, therefore, length signal outputs lines 38) is dependent on the maximum possible instruction length and the encoding scheme used for length signals. For the example of FIG. 2, the maximum possible number of bytes in an instruction is four, and the length signals are implemented as "one-hot" signals, i.e., only one signal is provided as active for each byte length. As a result, each length decoder 30 shown in FIG. 2 has four length signal outputs, one for a one byte instruction, one for a two byte instruction, and so on. Each length decoder 30 asserts a "one-hot" signal on the length signal output line 38 corresponding to the length determined by the length decoder 30 for the current byte being processed in that column.

Since each length decoder 30 asserts the appropriate length signal as soon as it completes the length decode for the current byte, length information may be available much earlier than under the "worst-case" decode time.

A plurality of marking units 34 is also provided, one in each column of the instruction marking circuit 20. The instruction length output lines 38 coupled to each length decoder 30 are also coupled to the marking unit 34 for the same column. Each marking unit 34 is further coupled to a number of marking lines 35 used to carry marking signals to mark a subsequent byte as the first byte of the next instruction. The number of marking lines 35 corresponds to the maximum number of bytes possible in the variable length instruction architecture. Thus, as shown in FIG. 2 for a maximum instruction length of four bytes, each marking unit 34 is coupled to four marking lines 35, one corresponding to each byte length available in the variable length instruction architecture. Accordingly, each marking unit 34 is also coupled to four marking lines 35 carrying marking signals generated by four upstream marking units 34.

Based on the length signals provided by the length decoder 30, the marking unit 34 determines the column containing the first byte of the next instruction in the instruction line. The marking unit 34 indicates the first byte of the next instruction by directly signaling a subsequent marking unit 34 in a downstream column via a marking signal over the appropriate marking line 35. Marking may be achieved, for example, by sending a "one-hot" signal over the appropriate marking line 35 to a downstream marking unit 34. Each marking line 35 is coupled between the marking unit 34 of the present column and a marking unit 34 for a subsequent column: the marking line 35 used to signal a one byte length instruction is coupled to the marking unit 34 for the next column of the instruction marking circuit 20; the marking line 35 used to signal a two byte length instruction is coupled to the marking unit 34 two columns away, and so on. The marking unit 34 asserting a marking output thereby directly marks the first byte of the next instruction of the fetched line.

For those marking units 34 at the end of the instruction marking circuit 20, the marking lines 35 used to mark a column beyond the end of the instruction marking circuit 20 are "wrapped around" to the marking units 34 at the front of the instruction marking circuit 20. The marking information transmitted via the wrapped-around marking lines 35 therefore marks the first byte of the first instruction on the next fetched instruction line.

Activation of a marking output of a marking unit 34 is controlled by satisfaction of certain system conditions. For example, a marking unit 34 waits for an indication that its column contains the first byte of an instruction, as provided by the marking signal received over the marking lines 35 from upstream marking units 34. A marking unit 34 also waits for an indication that the bytes that comprise the instruction have been loaded into their respective byte latches 28 and are ready for transmission, for example, as provided by an INSTRUCTION_READY signal provided by length decoder 30 and carried by length decoder handshaking lines 37. A marking unit 34 also waits for an indication that the instruction steering circuit 22 is available to receive an instruction for decoding and execution, for example, as provided by a BUFFER_AVAILABLE signal produced by instruction steering circuit 22 and carried by output buffer handshaking lines 36. These signals can arrive in any order.

Once these conditions have been satisfied, the instruction bytes are transmitted from the byte latches 28 to the instruction decode circuit 24 over byte latch output lines 29 and via a crossbar switch and output buffer within the instruction steering circuit 22. Instruction length data is also transmitted from the length decoder to the instruction decode circuit 24 via the crossbar switch and output buffer. The byte latches 28 are then loaded with new bytes from the next instruction line in instruction line buffer 26. A marking signal is concurrently sent over a marking line 35 to the marking unit 34 in the downstream column containing the first byte of the next instruction. The marking unit 34 in that downstream column may then perform a similar marking and transfer operation.

As a result of the above, the generation and transmission of all instruction bytes and marking information flows through the length decoders 30 and marking units 34 in a self-timed manner, and at an average speed that is faster than clocked circuits. To further increase the throughput of the instruction length decoding and marking process, processing of the bytes in a next instruction line can begin as soon as the individual byte latches 28 processing previous instruction bytes become available. The wrap around marking information generated during a current instruction line remains available to mark the first byte of the first instruction in the next instruction line.

In a second embodiment of an instruction decode block 14 implementing self-timed instruction length decoding, marking, and steering, as described in the aforementioned patent application, multiple self-timed marking units 34 are employed to increase the throughput capabilities of the instruction decode block 114. FIG. 3 shows such an embodiment, wherein the instruction decode block 114 is implemented having sixteen columns and is capable of processing instructions up to 4 bytes in length. As shown in FIG. 3, instruction marking circuit 120 is implemented using multiple marking units 34 in each column, with each marking unit 34 of the column given a different "row" designation for descriptive purposes. Marking signals are propagated through the marking circuit by sending the marking signals to the marking unit 34 of the next higher row in the column to be marked. The number of rows to be implemented in an instruction marking circuit 20 can be determined based on a calculation of the speed of instruction marking in relation to the speed of the steering function. For the embodiment shown in FIG. 3, three rows (row 0, row 1, and row 2) are implemented in instruction marking circuit 120, although other quantities can be implemented.

The instruction steering circuit 122 is implemented to mirror the instruction marking circuit 120, such that instruction steering circuit 122 contains a crossbar switch 62 having a number of rows equal to the number of rows in the instruction marking circuit 120, and a number of output buffers 64 equal to the number of rows in the instruction marking circuit 120. Instruction bytes are transferred, via the row of the crossbar switch 62 that is the same row as the row of marking unit 34 that has processed those instruction bytes, the output buffer 64 of the same row designation as the row of the marking is unit 34. Instructions are therefore incrementally spread across each output buffer, allowing the instruction decode circuit 124 to fetch instructions sequentially from each output buffer using, for example, a row pointer 301.

A more detailed description of the self-timed length decoding, marking, and steering of instructions may be found in the aforementioned patent application, which is expressly incorporated herein by reference.

An additional complexity presented in implementing a self-timed instruction decoding system is dealing with so-called "prefix" bytes. Present instruction architectures allow instructions to include one or more prefix bytes located before the actual "op code" instruction bytes. Prefix bytes can serve different purposes, including indicating the proper length of the "prefixed" instruction. Thus, in order to perform proper length decoding and marking, a self-timed instruction marking circuit used in a computer system having an instruction architecture that uses prefixes needs to be implemented to accommodate the presence of prefix bytes, and to allow the interpretation of those prefixes that will affect instruction length.

SUMMARY OF THE INVENTION

In an exemplary embodiment of the present invention, an instruction marking circuit is implemented having a buffer for receiving byte data, for example, instruction bytes. The instruction marking circuit also has a number of columns matching the number of byte locations in the buffer. Each column contains a self-timed length decoder coupled to the buffer to receive a byte from the buffer and perform a length decode based on the byte. The length decoder determines whether the byte is a prefix byte and, in particular, a length-affecting prefix byte. When the byte is a length-affecting prefix byte, a prefix signal is sent to the next downstream column in the instruction marking circuit. The length decoder then sets the length of the prefix byte to "one" and provides information, for example, a signal, that the byte is a prefix byte. The marking signal is then propagated through the marking circuit according to the marking process and according to the prefix byte length.

DETAILED DESCRIPTION OF THE DRAWINGS

Figure 1:
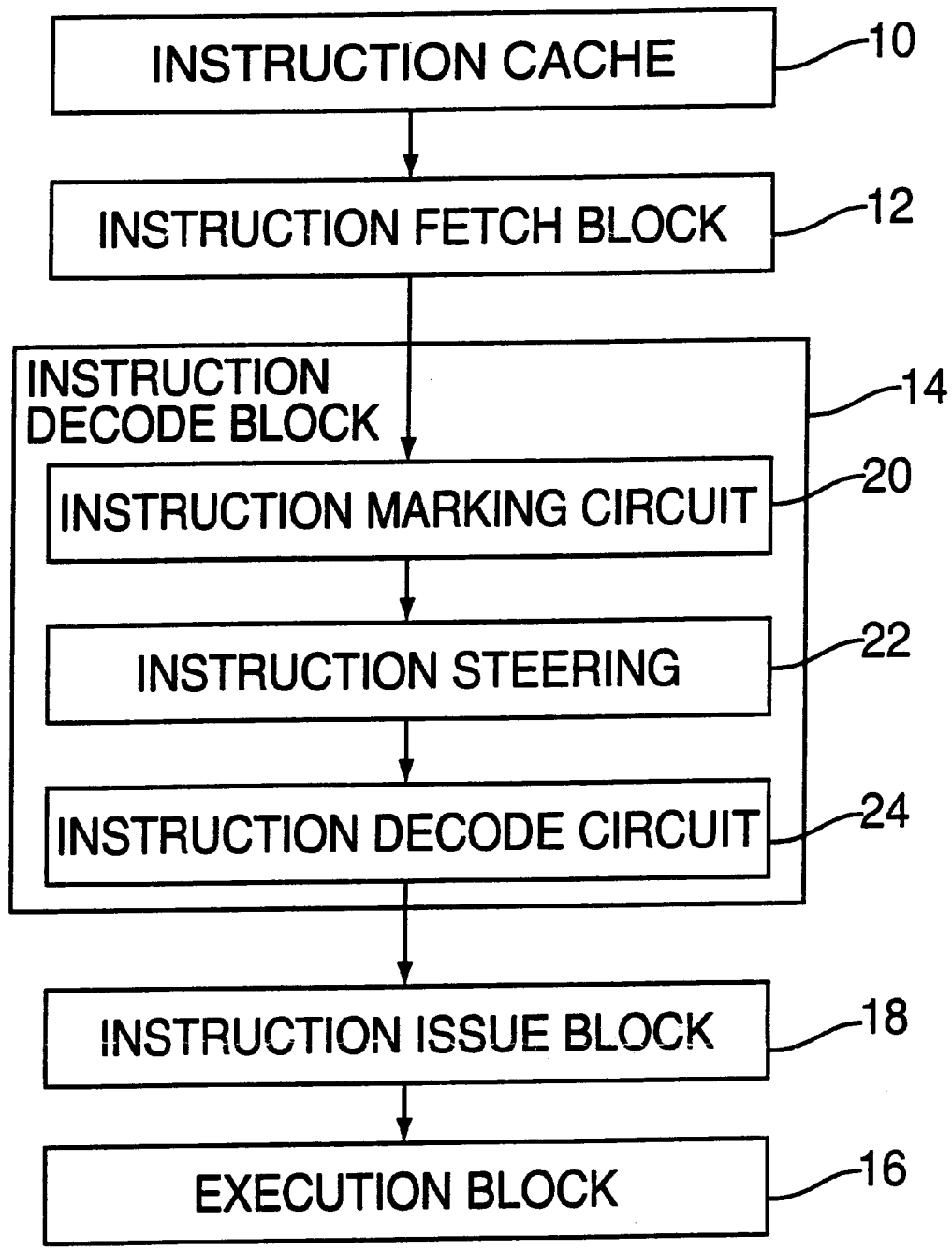
FIG. 1 is a block diagram of a representative instruction fetch, decode and execute pipeline of a computer system.
Figure 2:
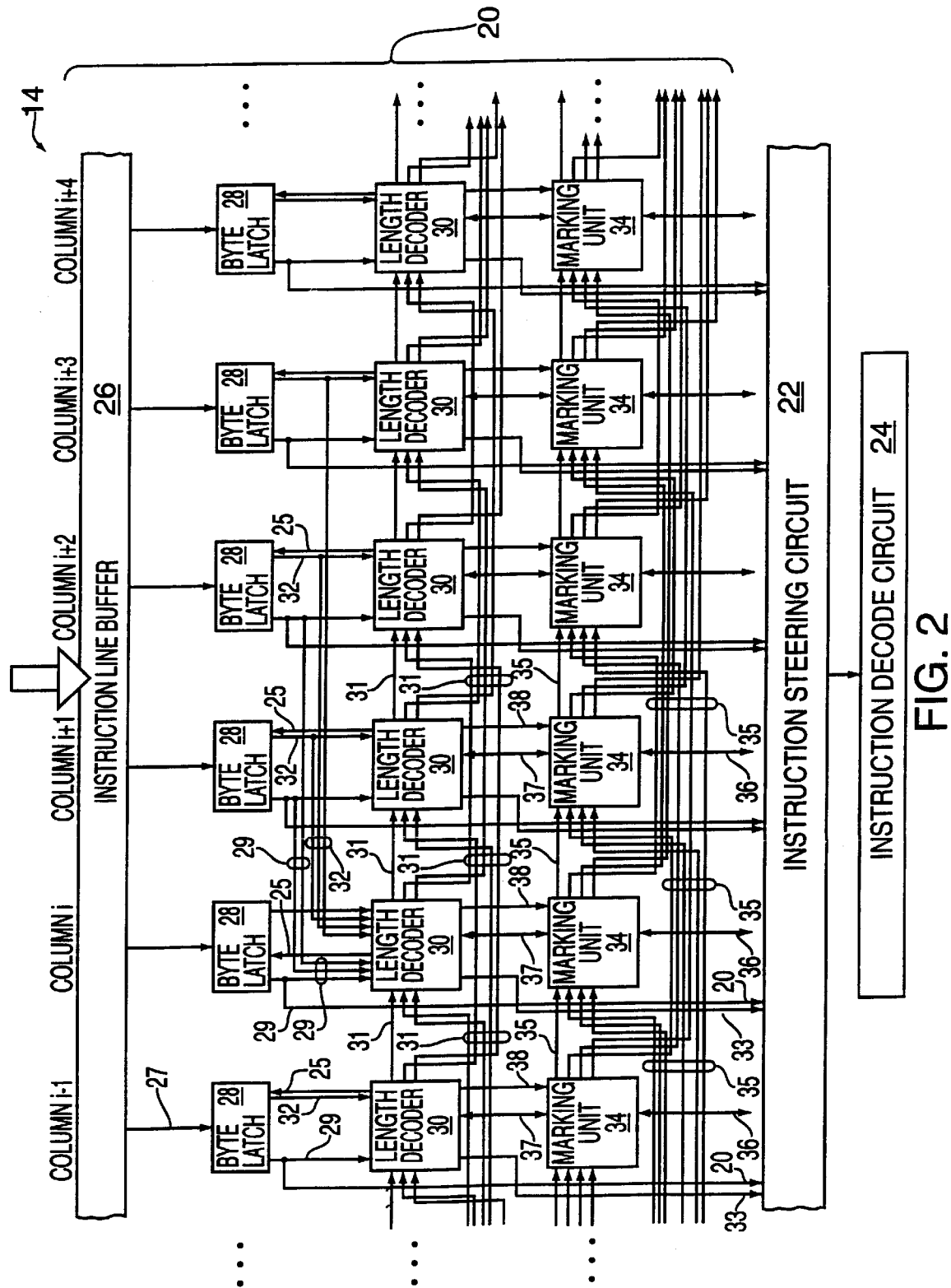
FIG. 2 is a block diagram of an embodiment of a self-timed instruction decode block.
Figure 4:
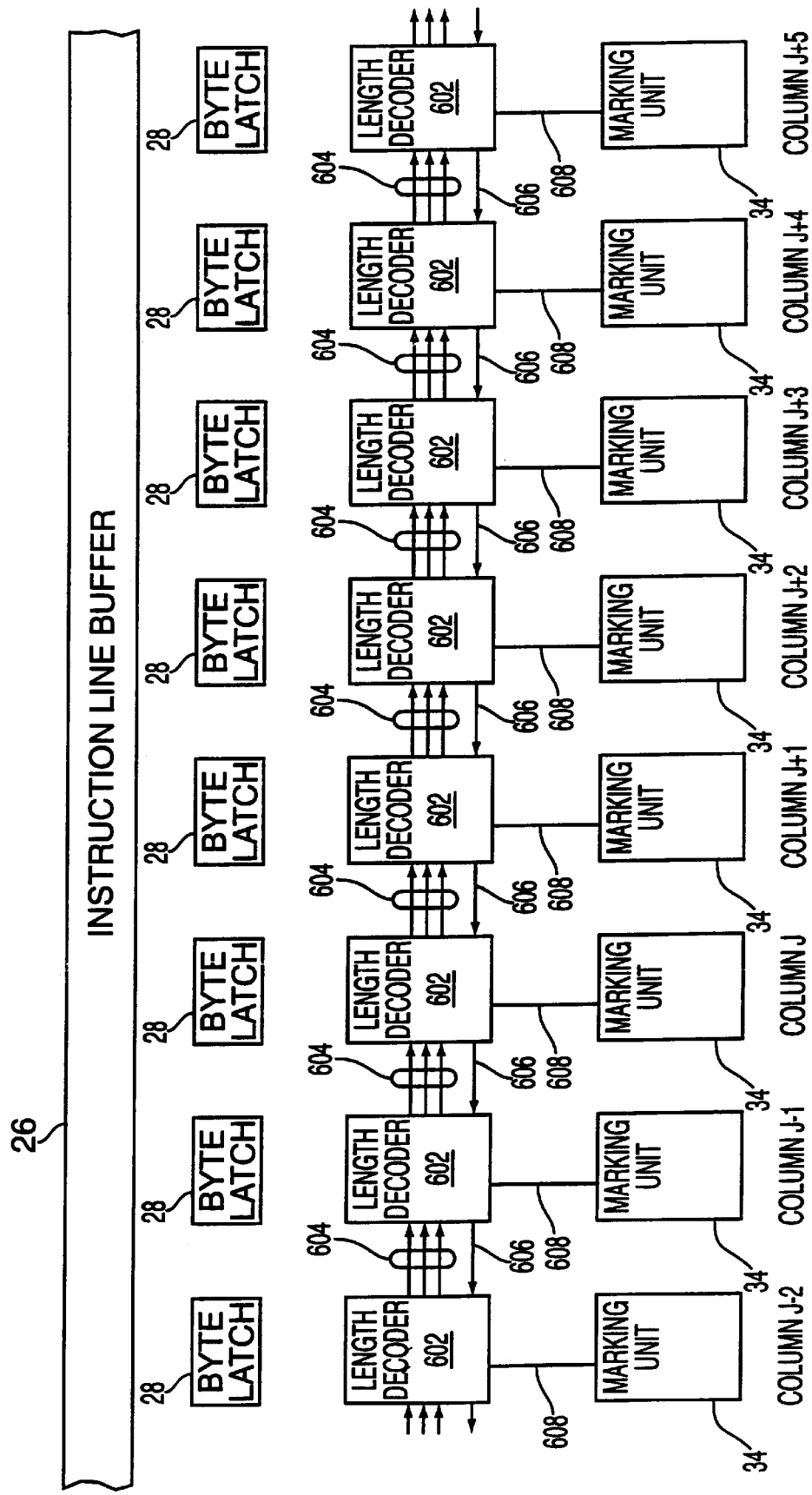
FIG. 4 is a block diagram of an embodiment of a self-timed instruction marking circuit according to the present invention.
Figure 5:
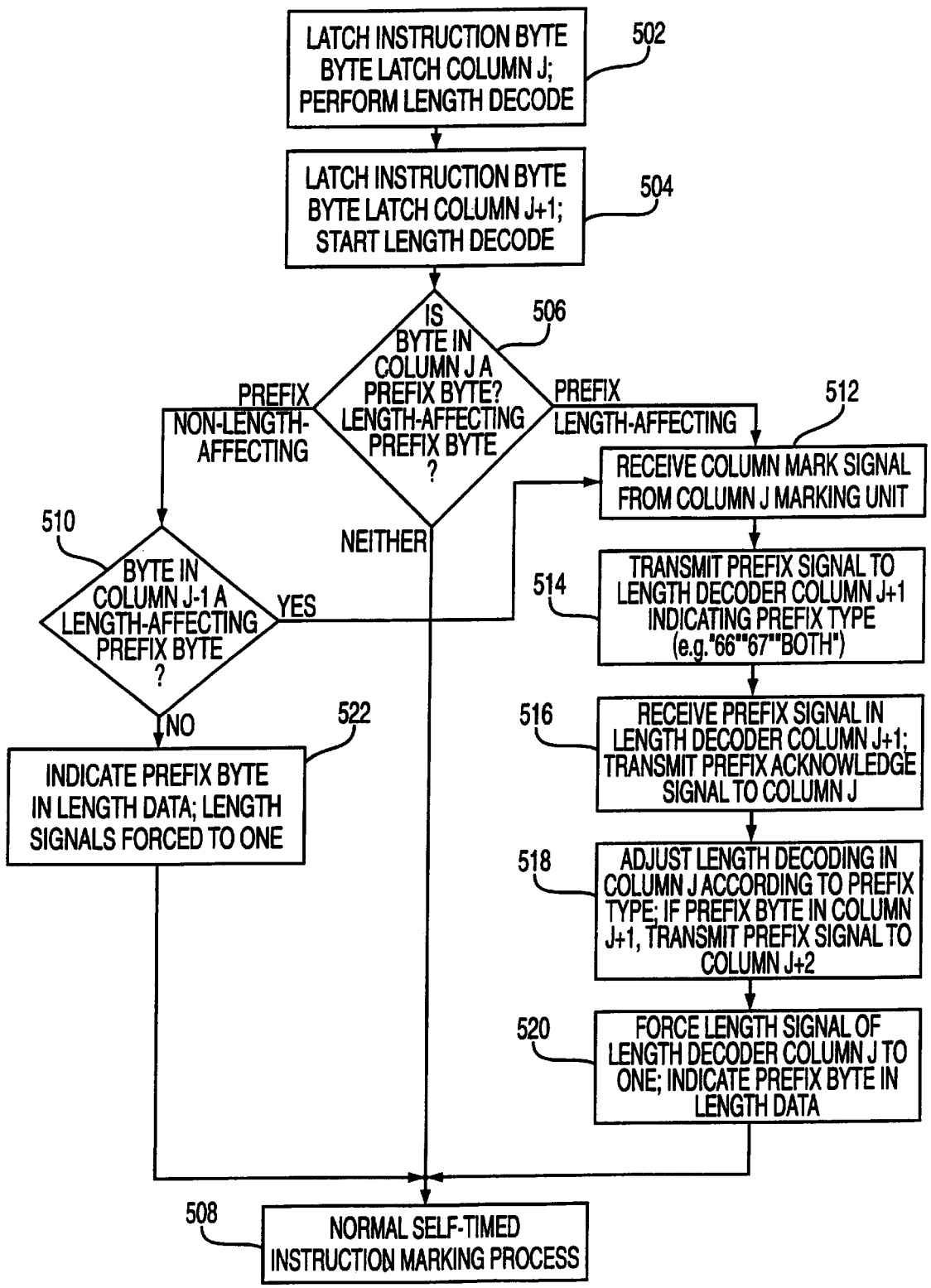
FIG. 5 is a flow chart of the operation of the self-timed marking circuit of FIG. 4.

The present invention can be described with reference to FIGS. 4 and 5, which depict an embodiment of the present invention. FIG. 4 shows a block diagram of an embodiment of a portion of a self-timed instruction marking circuit 220 according to the present invention. Although only a portion of the self-timed instruction marking circuit 220 is shown, the generic columns described (column j, j+1, j+2, and so forth) apply equally to all columns of the circuit. The self-timed instruction marking circuit 220 includes byte latches 28, length decoders 602, and marking units 34, with each byte latch 28, length decoder 602 and marking unit 34 located in a separate column of the self-timed instruction marking circuit 220. Although not shown in FIG. 4 for purposes of clarity, byte latches 28, length decoders 602, and marking units 34 are interconnected by various signal lines in order to implement the self-timed length decoding and marking of instruction bytes as described previously with regard to FIG. 2 (and in greater detail in the aforementioned patent application).

As shown in FIG. 4 for this embodiment, each length decoder 602 is coupled to a downstream length decoder 602 via prefix signal lines 604. For example, the length decoder 602 of column j is coupled to the length decoder 602 of column j+1, the length decoder 602 of column j+1 is coupled to the length decoder 602 of column j+2, and so forth. The length decoder 602 of the last column of self-timed instruction marking circuit 220 is "wrapped around" so that it is coupled to the length decoder 602 of the first column of self-timed instruction marking circuit 220. Column mark lines 608 are also provided between the length decoder 602 and marking unit 34 of each column, in order to inform the length decoder 602 of when the column has been marked.

This particular embodiment of the present invention also implements a handshaking scheme between columns. As shown by FIG. 4, each length decoder 602 is also coupled to an upstream length decoder 602 via a prefix acknowledge line 606. For example, the length decoder 602 of column j+1 is coupled to the length decoder 602 of column j, the length decoder 602 of column j is coupled to the length decoder 602 of column j−1, and so forth. The prefix acknowledge line 606 from length decoder 602 of the first column of self-timed instruction marking circuit 220 is "wrapped around"

so that it is coupled to the length decoder 602 of the last column of self-timed instruction marking circuit 220.

Persons with skill in the art will recognize that other schemes for insuring the transmission and receipt of the prefix signals between length decoders may be used instead of the aforementioned handshaking scheme. For example, a scheme using memory elements and pulses, such as implemented for the propagation of marking signals in the aforementioned patent application, may alternatively be used. Other schemes may also be available.

The number of prefix signal lines 604 used between each length decoder 602 is dependent on the number of length-affecting prefixes used by the instruction architecture of the computer system and the encoding scheme used for the prefix signals. In the embodiment of the present invention, the instruction architecture uses two length-affecting prefixes—"66" and "67." The embodiment is implemented as a "one hot" encoding scheme, such that the presence of either or both of these bytes is indicated by a single signal. Accordingly, the embodiment of the present invention uses three prefix signal lines 604 which each carry either a PREFIX_66, PREFIX_67, PREFIX_BOTH signal, as is described more fully below. Those with skill in the art will likewise recognize that alternate encoding schemes may be used to implement the prefix signals mentioned above.

The operation of the embodiment of the present invention can be explained with reference to an example of the processing of a length affecting prefix byte by column j and j+1 of the instruction marking circuit 220, as shown by the flow chart of FIG. 5. In step 502 an instruction byte is latched into byte latch 28 of column j, and this byte is received by the length decoder 602 of column j. The length decoder performs a length decode on the byte to determine the length of the instruction (should the byte be marked as a first byte of an instruction) and whether the byte is a prefix byte. In step 504 an instruction byte is latched into byte latch 28 of column j+1, received by length decoder 602 of column j+1, and length decoding is commenced to determine the speculative instruction length and whether the byte is a prefix byte. Note that steps 502 and 504 may occur simultaneously according to the parallel processing performed in the instruction marking circuit 220.

In decision step 506, if the length decoder 602 of column j determines that the byte it is processing is not a prefix byte, normal processing of the instruction byte is commenced (step 508). That is, an appropriate length signal is sent from the length decoder 602 of column j to the marking unit 34 of column j to indicate the instruction length. An instruction ready signal is provided from length decoder 602 to marking unit 34 to indicate that all instruction bytes are ready to be transferred. The marking unit then produces a marking signal to mark the downstream column that corresponds to the first byte of the next instruction, according to the timing described previously for the self-timed instruction marking operation.

If the length decoder 602 of column j determines that the byte being processed is a prefix byte, but not a length-affecting prefix byte, non-length-affecting prefix byte handling is performed. In this embodiment, as shown in step 510 of FIG. 5, the length decoder 602 of column j awaits either a signal from the marking unit 34 of column j that the column has been marked, or a prefix signal from the length decoder 602 of column j–1. If the column mark signal arrives before any prefix signal arrives, no length-affecting prefix bytes are pending, and consequently the length signal outputs of length decoder 602 are forced to indicate a "one"

signal, and the length data outputs of length decoder 602 are forced to indicate that the byte is a prefix byte (step 522). This can be done, for example, by setting a specific bit in the length data, such that downstream processing circuitry (for example, the instruction decoding circuit 24) can identify the byte as a prefix to a subsequent instruction. Other signaling methods are also possible. Normal self-timed marking is thereafter performed (step 508).

If a prefix signal arrives from column j–1 before a column mark signal arrives from marking unit 34, a length-affecting prefix byte is pending from an upstream column. Since the byte in column j is a prefix, the length-affecting prefix information must be passed to column j+1. Therefore, processing of the non-length affecting prefix continues according to the processing used for length-affecting prefix bytes (described below).

If the length decoder 602 of column j determines that the byte being processed is a length-affecting prefix byte, length-affecting prefix byte handling is performed. Typical length-affecting prefix handling procedures are described by steps 512–520 of FIG. 5. In step 512, length decoder 602 awaits receipt of a signal indicating that column j has been marked as the first byte of an instruction. This signal is provided by the marking unit 34 over the column mark line 608, and is, for example, a logical ORing of all the marking lines 35 connected as inputs to marking unit 34. Once the column mark has been indicated, in step 514 a prefix signal is output over an appropriate prefix signal line 604 to indicate to the length decoder 602 of column j+1 the identity of the length-affecting prefix byte detected (for example, 66, 67 or both). For example, should the length decoder 602 of column j determine that the prefix "67" is present in column j, a PREFIX_67 signal is output over the appropriate prefix signal line 604 to indicate to the length decoder 602 of column j+1 that a "67" prefix is present in the preceding column.

In step 516, the length decoder 602 of column j+1 receives the prefix signal over the prefix signal lines 604, and outputs a prefix acknowledge signal over the prefix acknowledge line 604, indicating that the length decoder 602 of column j+1 has received the prefix signal. Receipt of this prefix signal causes the length decoder 602 of column j+1 to perform additional processing, for example, to determine how the prefix byte signaled by column j affects the instruction length (step 518). If the byte being processed by column j+1 is itself another prefix byte, the prefix signal sent by column j must be passed on to the length decoder 602 of the next column. Also, if the prefix byte being processed by column j+1 is another length-affecting prefix byte, a signal must be sent to the next indicating the presence of both length-affecting prefix bytes as prefixes to the instruction. In either case, the processing in column j+1 of another prefix byte is the same as is done in column j. The prefix byte latched into column j+1 is held until it is both ready to be transmitted and the length decoder 602 of column j+1 has determined if it is a prefix byte or not.

When the prefix acknowledge signal is received by the length decoder 602 of column j (step 520), it forces its length signal outputs to send a length signal of "one" to the marking unit 34 of column j over the length signal lines 38, and forces its length data outputs to send an indication of the byte as a prefix byte over the length data lines 33. With the length signals of the length decoder 602 of column j properly set, normal instruction handling can resume (step 508). Specifically, the marking unit 34 of column j awaits a signal from length decoder 602 of column j indicating that the byte is ready for transmission (for example, the instruction ready signal), and a signal from instruction steering circuit 22 indicating that it is ready to receive instruction bytes (for example, the buffer available signal). When these indications are provided, marking unit 34 of column j sends a marking signal to the marking unit 34 one column downstream—marking unit 34 of column j+1—and the byte is sent to the instruction steering circuit 22 along with the length data.

Four situations serve to further illustrate the operation of the embodiment of the present invention. The first situation is of an instruction having a single prefix byte of "67." The length decoder 602 of column j detects the presence of a length-affecting prefix byte ("67") and sends a signal indicating that a "67" prefix has been detected over the prefix lines 604 to the length decoder 602 of column j+1. After an acknowledging signal is received from column j+1, the prefix handling system causes the length signal lines 38 of column j to signal an instruction length of one to the marking unit 34 of column j, and causes the length data lines 33 of column j to signal the byte as a prefix byte to the instruction steering circuit 22. Thus the marking signal will be propagated from the marking unit 34 of column j to the marking unit 34 of column j+1 according to the normal self-timed marking process.

Length decoder 602 of column j+1 receives the prefix signal indicating a "67" prefix has been detected and sends acknowledgment to column j. The length decoding logic of the length decoder 602 of column j+1 corrects the determined instruction length according to the meaning of the "67" prefix, and produces the appropriate length signal and length data outputs on the length signal lines 38 and length data lines 33, respectively, of column j+1. Normal self-timed marking causes the marking signal to be propagated from the marking unit 34 of column j+1 to the marking unit 34 of the column containing the first byte of the next instruction, as determined by the instruction length.

The second situation is of an instruction having a first prefix byte of "67" and a second prefix byte that is non-length-affecting. As in the first situation, column j detects the "67" byte as a length-affecting prefix byte, and signals column j+1 that a "67" prefix has been detected. After acknowledgment, column j completes processing of the prefix byte by signaling to the marking unit 34 of column j an instruction length of "one" and providing indication of a prefix byte on the length data lines 33. Thus the marking signal will be propagated from the marking unit 34 of column j to the marking unit 34 of column j+1 according to the normal self-timed marking process.

Length decoder 602 of column j+1 receives the prefix signal indicating a "67" prefix has been detected and sends acknowledgment to column j. The length decoding logic of the length decoder 602 of column j+1, through its own length decoding, detects the presence of a non-length affecting prefix byte in column j+1. The presence of the length-affecting prefix byte in column j is communicated to the length decoder 602 of column j+2 by asserting a "67" prefix signal over the prefix signal lines 604. The non-length-affecting prefix byte is processed by column j+1 by asserting (after acknowledgment is received from column j+2) a length output of "one" over the length signal lines 38 and indicating a prefix byte on the length data lines 33. Thus the marking signal will be propagated from the marking unit 34 of column j+1 to the marking unit 34 of column j+2.

Length decoder 602 of column j+2 receives the prefix signal indicating a "67" prefix has been detected and sends acknowledgment to column j+1. The length decoding logic of the length decoder 602 of column j+2 then corrects the determined instruction length according to the meaning of the "67" prefix, and produces the appropriate length signal and length data outputs on the length signal lines 38 and length data lines 33, respectively, of column j+2. Normal self-timed marking causes the marking signal to be propagated from the marking unit 34 of column j+2 to the marking unit 34 of the column containing the first byte of the next instruction, as determined by the instruction length.

The third situation is of an instruction having a first prefix byte of "67" and second non-length-affecting prefix byte, and a third prefix byte of "66." As in the first and second situations, column j detects the "67" byte as a length-affecting prefix byte, and signals column j+1 that a "67" prefix has been detected. Column j completes processing of the prefix byte by signaling to the marking unit 34 of column j (once acknowledgment has been received) an instruction length of "one" and providing indication of a prefix byte on the length data lines 33. Thus the marking signal will be propagated from the marking unit 34 of column j to the marking unit 34 of column j+1 according to the normal self-timed marking process.

Length decoder 602 of column j+1 receives the prefix signal indicating a "67" prefix has been detected and sends acknowledgment to column j. The length decoding logic of the length decoder 602 of column j+1, through its own length decoding, detects the presence of a non-length affecting prefix byte in column j+1. The presence of the length-affecting prefix byte is communicated to the length decoder 602 of column j+2 by asserting a "67" prefix signal over the prefix signal lines 604. The non-length-affecting prefix byte is processed by column j+1 by asserting a length output of "one" over the length signal lines 38 and indicating a prefix byte on the length data lines 33. Thus the marking signal will be propagated from the marking unit 34 of column j+1 to the marking unit 34 of column j+2.

Length decoder 602 of column j+2 receives the prefix signal indicating a "67" prefix has been detected and sends acknowledgment to column j+1. The length decoding logic of the length decoder 602 of column j+2, through its own length decoding, detects the presence of a "66" prefix byte in column j+2. The presence of both the length-affecting prefix byte "67", from column j and the "66" byte from column j+2 is communicated to the length decoder 602 of column j+3 by asserting a "both 66 and 67" prefix signal over the prefix signal lines 604. Column j+2 completes processing of the prefix byte after acknowledgment is received from column j+3 by signaling to the marking unit 34 of column j an instruction length of "one" and providing indication of a prefix byte on the length data lines 33. Thus the marking signal will be propagated from the marking unit 34 of column j+2 to the marking unit 34 of column j+3 according to the normal self-timed marking process.

Length decoder 602 of column j+3 receives the prefix signal indicating that both a "66" and "67" prefix has been detected and sends acknowledgment to column j+2. The length decoding logic of the length decoder 602 of column j+3 then corrects the determined instruction length according to the meaning of the "66" and "67" prefixes, and produces the appropriate length signal and length data outputs on the length signal lines 38 and length data lines 33, respectively. Normal self-timed marking causes the marking signal to be propagated from the marking unit 34 of column j+3 to the marking unit 34 of the column containing the first byte of the next instruction, as determined by the instruction length.

The fourth situation is of an instruction having a single, non-length-affecting prefix byte. The length decoder 602 of column j detects the presence of a non-length-affecting prefix byte, and awaits receipt of either a prefix signal from the length decoder 602 of column j−1 or the column marked signal from the marking unit 34 of column j. Since no length-affecting prefix bytes are pending in this situation, the column marked signal will arrive first. Consequently, the non-length-affecting prefix handling system causes the length signal lines 38 of column j to signal an instruction length of one to the marking unit 34 of column j, and causes the length data lines 33 of column j to signal the byte as a prefix byte to the instruction steering circuit 22. Thus the marking signal will be propagated from the marking unit 34 of column j to the marking unit 34 of column j+1 according to the normal self-timed marking process.

Figure 3:
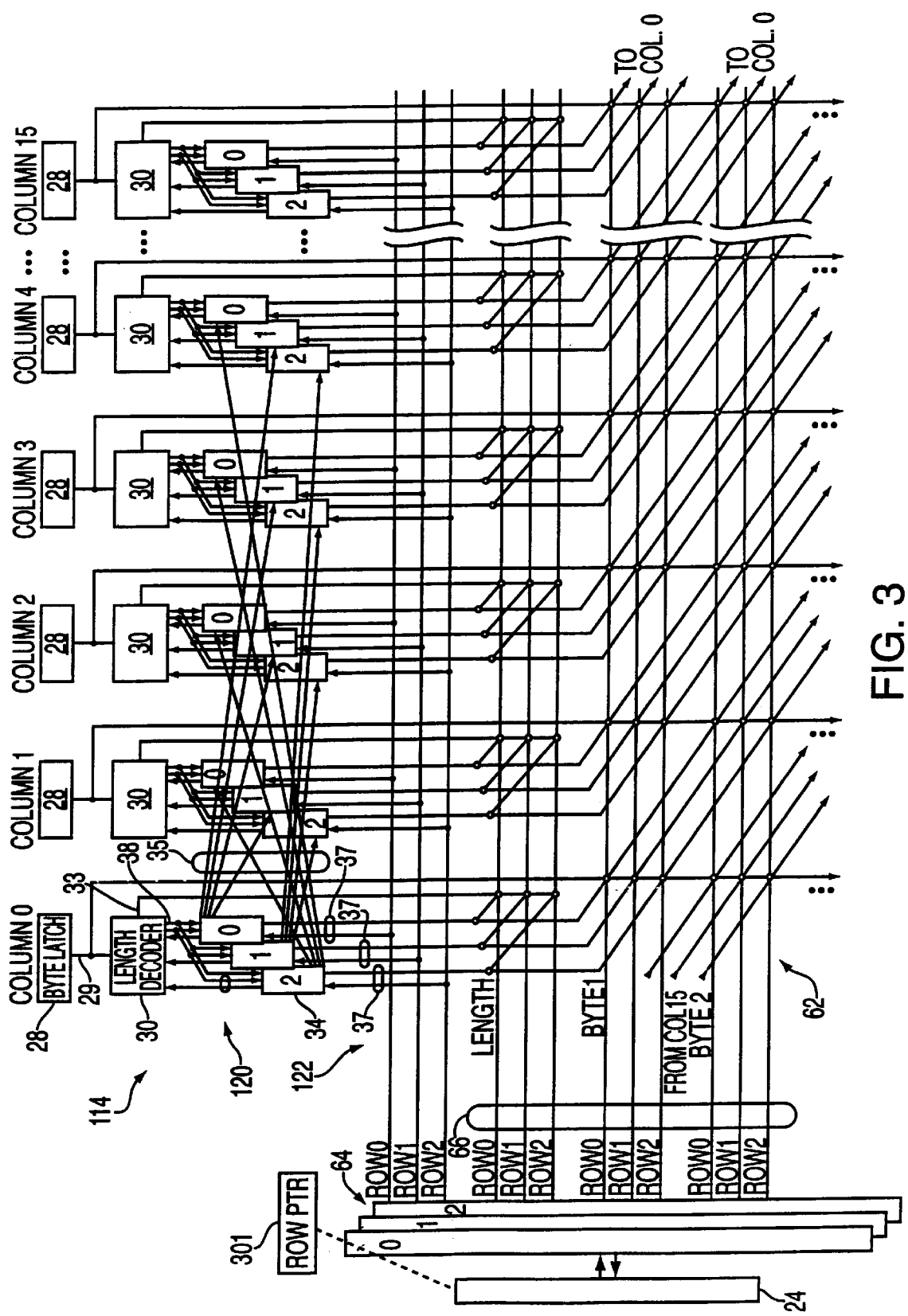
FIG. 3 is a block diagram of an embodiment of a self-timed instruction decode block having multiple marking units.

This embodiment of the present invention is also applicable to the instruction marking circuit 120 having multiple marking units, as described previously with regard to FIG. 3 (and in greater detail in the aforementioned patent application). Length decoders 602 may be used in such a case to perform the necessary length decoding without affecting the processing of marking information or instruction data. Since prefix bytes and instruction bytes will be transmitted to different output buffers 64 in the multiple row configuration of instruction steering circuit 122, the instruction decode circuit 124 reconstructs the instruction by retrieving the prefix byte from one output buffer 64 (for example, of row k) and the instruction bytes from the next output buffer 64 (for example, or row k+1).

Although the present invention has been described with respect to specific embodiments, various changes and modifications may be suggested to one skilled in the art. For example, it may be contemplated to implement part or all of the present invention as hardware, microcode, programmable logic, and/or software. The present invention is intended to encompass these and other changes and modifications as fall within the scope of the appended claims.

What is claimed is:

1. An instruction marking circuit, comprising:
   a buffer having a plurality of byte locations to receive bytes; and
   a plurality of columns corresponding to the plurality of byte locations, each column of the plurality of columns including,
   a self-timed length decoder coupled to the buffer to receive a corresponding byte from the plurality of byte locations, and having at least one length output, at least one prefix output and at least one prefix input, wherein the at least one prefix output is coupled to the at least one prefix input of a first downstream self-timed length decoder of a first downstream column of the plurality of columns, and
   a self-timed marking unit, coupled to the self-timed length decoder via the at least one length output to receive length data, and having a first marking output, a second marking output and a marking input, wherein
      (a) the first marking output is directly coupled to a first downstream self-timed marking unit of the first downstream column to provide a marking signal, and the second marking output is directly coupled to a second downstream self-timed marking unit of a second downstream column to provide the marking signal, and
      (b) the marking unit input is directly coupled to an upstream self-timed marking unit of an upstream column of the plurality of columns to provide the marking signal.

2. The instruction marking circuit of claim 1, wherein the self-timed length decoder provides a prefix signal via the at least one prefix output to the first downstream self-timed length decoder when the corresponding byte is a prefix byte.

3. The instruction marking circuit of claim 2, wherein the self-timed length decoder provides a prefix signal via the at least one prefix output to the first downstream self-timed length decoder when the corresponding byte is a length-affecting prefix byte.

4. The instruction marking circuit of claim 1, further comprising a prefix signal acknowledge system.

5. The instruction marking circuit of claim 4, wherein the prefix signal acknowledge system comprises a prefix acknowledge output and a prefix acknowledge input in the self-timed length decoder, wherein the prefix acknowledge input of the self-timed length decoder is coupled to the prefix acknowledge output of the first downstream self-timed length decoder to provide a prefix acknowledge signal.

6. The instruction marking circuit of claim 5, wherein the self-timed length decoder transmits the prefix acknowledge signal when the prefix signal has been received.

7. The instruction marking circuit of claim 6, wherein the at least one prefix output is three prefix outputs.

8. The instruction marking circuit of claim 1, wherein the at least one prefix output is three prefix outputs.

9. The instruction marking circuit of claim 8, wherein the self-timed length decoder produces one of a "66" prefix present signal, a "67" prefix present signal, and a both "66" and "67" prefixes present signal.

10. The instruction marking circuit of claim 1, wherein the self-timed marking unit of each column is coupled to the self-timed length decoder of each column to provide a column mark signal when the self-timed marking unit has received the marking signal.

11. A method for self-timed marking of instructions, comprising the steps of:
   receiving a first byte in a first column of an instruction marking circuit;
   performing a length decode of the first byte to produce a first length signal;
   determining whether the first byte is a length-affecting prefix byte;
   when the first byte is a length-affecting prefix byte,
      (a) transmitting a prefix signal to a second column of the instruction marking circuit,
      (b) forcing the first length signal to indicate an instruction length of one, and
      (c) producing a signal to indicate the first byte is a prefix byte; and
   propagating a marking signal through the instruction marking circuit according to the first length signal.

12. The method of claim 11, wherein the prefix signal indicates a type of prefix detected.

13. The method of claim 12, wherein the type of prefix indicated is one of a "66" prefix, a "67" prefix, or both "66" and "67" prefixes.

14. The method of claim 11, further comprising the steps of:
   receiving a second byte in the second column of the instruction marking circuit;
   performing a length decode of the second byte to produce a second length signal; and
   when the first byte is a length-affecting prefix byte,
      (d) receiving the prefix signal in the second column; and
      (e) adjusting the second length signal according to the prefix signal.

15. The method of claim 14, further comprising the step of, when the first byte is a prefix byte, (f) transmitting a prefix acknowledge signal to the first column.

16. The method of claim 15, wherein the forcing step is performed after the prefix acknowledge signal is received.

17. The method of claim 14, further comprising the steps of:

determining whether the second byte is a length-affecting prefix byte;

when the first byte and second byte are length-affecting prefix bytes,
  (a) transmitting the prefix signal to a third column of the instruction marking circuit to indicate the presence of two length-affecting prefix bytes,
  (b) forcing the second length signal to indicate an instruction length of one, and
  (c) producing a signal to indicate that the second byte is a prefix byte; and propagating the marking signal through the instruction marking circuit according to the second length signal.

18. The method of claim 11, further comprising the steps of:

receiving a second byte in the second column of the instruction marking circuit;

performing a length decode of the second byte to produce a second length signal, including determining whether the second byte is a prefix byte;

when the first byte is a length-affecting prefix byte and the second byte is a prefix byte but not a length-affecting prefix byte,
  (a) receiving the prefix signal in the second column;
  (b) transmitting the prefix signal to a third column of the instruction marking circuit,
  (c) forcing the second length signal to indicate an instruction length of one, and
  (d) producing a signal to indicate that the second byte is a prefix byte; and propagating the marking signal through the instruction marking circuit according to the second length signal.

\* \* \* \* \*